United States Patent
Phan et al.

(10) Patent No.: US 9,097,599 B2
(45) Date of Patent: Aug. 4, 2015

(54) DEVICE FORMING A MANOMETER INTENDED FOR MEASURING BIPHASIC FLUID PRESSURE, ASSOCIATED METHOD OF MANUFACTURE AND FLUIDIC NETWORK

(75) Inventors: Hai Trieu Phan, Grenoble (FR); Philippe Coronel, Barraux (FR); Pascal Fugier, Bernin (FR); Jerome Gavillet, Saint-Egreve (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 267 days.

(21) Appl. No.: 13/642,997

(22) PCT Filed: Apr. 27, 2011

(86) PCT No.: PCT/EP2011/056656
§ 371 (c)(1), (2), (4) Date: Oct. 23, 2012

(87) PCT Pub. No.: WO2011/134997
PCT Pub. Date: Nov. 3, 2011

(65) Prior Publication Data
US 2013/0052552 A1    Feb. 28, 2013

(30) Foreign Application Priority Data
Apr. 28, 2010   (FR) .................................. 10 53276

(51) Int. Cl.
*G01L 7/18*    (2006.01)
*G01L 9/00*    (2006.01)

(52) U.S. Cl.
CPC .................. *G01L 7/18* (2013.01); *G01L 9/0095* (2013.01); *Y10T 29/494* (2015.01); *Y10T 29/49224* (2015.01); *Y10T 137/8326* (2015.04)

(58) Field of Classification Search
None
See application file for complete search history.

(56) References Cited

U.S. PATENT DOCUMENTS 4,380,933 A  *  4/1983  Irvin ............................... 73/749
4,404,855 A      9/1983  Leidenfrost
(Continued)

FOREIGN PATENT DOCUMENTS

| EP | 0 629 286 | 12/1994 |
| WO | WO 93/18382 | 9/1993 |
| WO | WO 03/076082 A2 | 9/2003 |

OTHER PUBLICATIONS

French Preliminary Search Report issued Nov. 16, 2010, in Patent Application No. 1053276 (with English Translation of Category of Cited Documents).

(Continued)

*Primary Examiner* — Andre Allen
(74) *Attorney, Agent, or Firm* — Oblon, McClelland, Maier & Neustadt, L.L.P.

(57) ABSTRACT

A device forming a manometer, configured to measure pressure of a biphasic fluid in a fluidic network, including: a first channel inside which a biphasic fluid is able to flow; a second channel emerging into the first channel, wherein the second channel is blind, with each of its dimensions less than capillary length of the fluid's liquid phase, and with at least one of its lengthways wall having a surface energy gradient that decreases from its inlet to the end. The surface energy gradient enables the wetting angle of the meniscus of the fluid's liquid phase to be increased in the blind channel from its inlet to the end. Such a device may find application to measurement of pressure of a biphasic fluid in a heat exchanger or in a fuel cell.

15 Claims, 7 Drawing Sheets

(56) References Cited

U.S. PATENT DOCUMENTS

| | | | |
|---|---|---|---|
| 6,659,965 | B1 | 12/2003 | Kensey et al. |
| 6,843,121 | B1 | 1/2005 | DeBar et al. |
| 6,843,272 | B2 | 1/2005 | Schoeniger et al. |
| 8,408,073 | B2 * | 4/2013 | Sparks et al. ............ 73/861.356 |
| 2011/0151578 | A1 * | 6/2011 | Abate et al. .................... 436/180 |
| 2012/0260718 | A1 * | 10/2012 | Sparks et al. ................. 73/19.03 |
| 2013/0078164 | A1 * | 3/2013 | Baroud et al. ................. 422/502 |
| 2014/0369005 | A1 | 12/2014 | Gavillet et al. |

OTHER PUBLICATIONS

International Search Report issued May 30, 2011, in PCT/EP2011/056656.

Nimisha Srivastava, et al., "Microfluidic pressure sensing using trapped air compression", Lab on a Chip, vol. 7, XP 002608061, Apr. 4, 2007, pp. 633-637.

U.S. Appl. No. 14/001,088, filed Aug. 22, 2013, Dellea, et al.
U.S. Appl. No. 14/131,082, filed Jan. 6, 2014, Dellea, et al.
U.S. Appl. No. 14/369,752, filed Jun. 30, 2014, Dellea, et al.
U.S. Appl. No. 14/375,858, filed Jul. 31, 2014, Dellea, et al.
U.S. Appl. No. 14/375,994, filed Jul. 31, 2014, Dellea, et al.
U.S. Appl. No. 14/375,532, filed Jul. 30, 2014, Dellea, et al.
U.S. Appl. No. 14/398,340, filed Oct. 31, 2014, Savelli, et al.
U.S. Appl. No. 14/423,957, filed Feb. 25, 2015, Dellea, et al.

* cited by examiner

DEVICE FORMING A MANOMETER INTENDED FOR MEASURING BIPHASIC FLUID PRESSURE, ASSOCIATED METHOD OF MANUFACTURE AND FLUIDIC NETWORK

TECHNICAL FIELD

The invention concerns a device forming a manometer, intended to measure the pressure of a biphasic fluid in a fluidic network.

It relates to an improvement of the sensitivity of a manometer, allowing a manifest reduction of the dimensions and its incorporation in a fluidic network.

The applications at which the invention is directed in particular are biphasic fluid heat exchangers, fuel cells or other systems involving the use of a biphasic blend operating at around atmospheric pressure.

PRIOR ART

In systems such as a biphasic fluid heat exchanger or a fuel cell, the liquid and vapour phases of a given fluid are simultaneously present in the fluidic network supporting the heat and mass exchanges.

The pressure of the fluid, the mass flow ratio between the vapour and liquid phases (titre) of the biphasic fluid, together with their respective distributions in the fluidic network, are parameters which reveal, at all times, the system's operational efficiency.

Thus, precise knowledge of these parameters, in real time and at critical points of the fluidic network, such as hot points, dryout locations or clogging points, could enable a malfunction/deterioration to be prevented, or the systems' operating regime to be corrected/adjusted.

In other words, it would be desirable to be able to incorporate devices for precise measurement of these parameters, and more specifically of pressure, directly in the fluidic networks of systems mentioned above, without impairing their operation or their compactness.

It is known to measure the pressure of a liquid using a manometer.

In particular, it is known to measure the pressure of a liquid by measuring the displacement of a meniscus of the liquid in a capillary tube.

U.S. Pat. No. 4,404,855 proposes measurement of a pressure differential by measuring the displacement of a liquid meniscus at the interface with an air bubble injected by a syringe in order to increase measuring sensitivity by a factor of $10^4$. The dimensions of the measuring device thus proposed are macroscopic, and do not allow it to be integrated in a fluidic network of a compact system. In addition, the minimum displacement of the meniscus which may be observed is of the order of 0.1 mm and requires the use of optical means external to the sensitive element of the manometer proper.

The aim of the invention is then to propose a solution enabling a device for precise measurement of the pressure of a biphasic fluid to be incorporated in a fluidic network of a system, such as a heat exchanger or a fuel cell, without impairing the operation of this system, nor its compactness.

DESCRIPTION OF THE INVENTION

To accomplish this, the object of the invention is a device forming a manometer, intended to measure the pressure of a biphasic fluid in a fluidic network, including:
  a first channel inside which a biphasic fluid is able to flow,
  a second channel emerging into the first channel, where the second channel is blind, with each of its dimensions less than the capillary length of the fluid's liquid phase, and with its lengthways wall having a surface energy gradient which decreases from its inlet to the end, where the surface energy gradient enables the wetting angle of the meniscus of the fluid's liquid phase to be increased in the blind channel from its inlet to the end.

Capillary length is a characteristic dimension of a liquid in relation at which the capillary forces and gravitational forces are of the same magnitudes. In the case of water, the capillary length lc and the capillary volume Vc have the following respective values:

$$lc \sim \sqrt{\frac{\sigma}{\rho g}} \sim 2.7 \text{ mm}$$

and $$vc \sim \tfrac{4}{3}\pi\left(\tfrac{lc}{2}\right)^3 \sim 10 \ \mu L.$$

Thus, in the context of the invention, for a given liquid, each of the dimensions constituted by the hydraulic diameter and the length of the blind channel is less than the capillary length of the liquid.

Thus, according to the invention, the production of a blind channel connected directly to a channel (main channel) of a fluidic network, and the addition of a surface energy gradient along its lengthways wall, enables a liquid meniscus at the interface with the vapour phase to be located precisely.

The displacement of this meniscus is dependent on the pressure of the fluid at the inlet of the blind channel.

Indeed, the inventors' point of departure was the observation that in a liquid manometer the displacement of the meniscus at the interface with the air bubble under the effect of pressure was influenced by the wetting of the liquid in contact with the walls of the capillary tube.

They therefore sought to examine this influence more precisely from a blind channel in which a fluid was simultaneously present in the liquid and vapour phases. Air can also be present in the gaseous phase.

Figure 1:
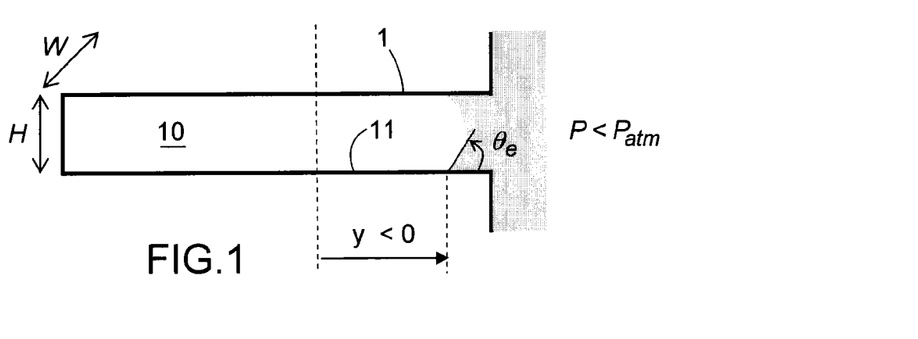
FIG. 1 represents as a lengthways diagrammatic section view a blind channel 1 of a device according to the invention.

This configuration is represented in FIG. 1.

The force equilibrium relationship may thus be written as follows:

$$P_{liquide} - P_{gaz} = \frac{2(H+W)}{HW}\sigma\cos\theta_e \qquad (1)$$

where:
$P_{liquid}$ is the pressure of the liquid;
$P_{gas}$ is the pressure of the gas;
W is the width of the blind channel;
H is the height of the blind channel;
σ is the surface tension constant of water (~72 mJ/m²);
$\theta_e$ is the wetting angle of water on lengthways wall 11 of blind channel 1.

This equation is written differently:

$$\Delta P = \frac{4}{D_h}\sigma\cos\theta_e \qquad (2)$$

where $\Delta P = P_{liquid} - P_{gas}$ and $D_h$ is the hydraulic diameter, which is defined by:

$$D_h = \frac{2HW}{(H+W)} \qquad (3)$$

The pressure of the gas trapped in cavity 10 can be determined by the ideal gas equation:

$$P_{gaz} = \frac{L_1}{L_1 - y}P_{atm} \qquad (4)$$
} in which Patm is the atmospheric pressure,
L1 is the distance between a flat meniscus ($\cos \theta_e = 1$) and the end of cavity 10;
and y is the position of the liquid (water) meniscus at the interface with the gas.

It may be considered that the wetting effect is significant if both terms of the equation (2) are of the same order of magnitude.

Figure 2:
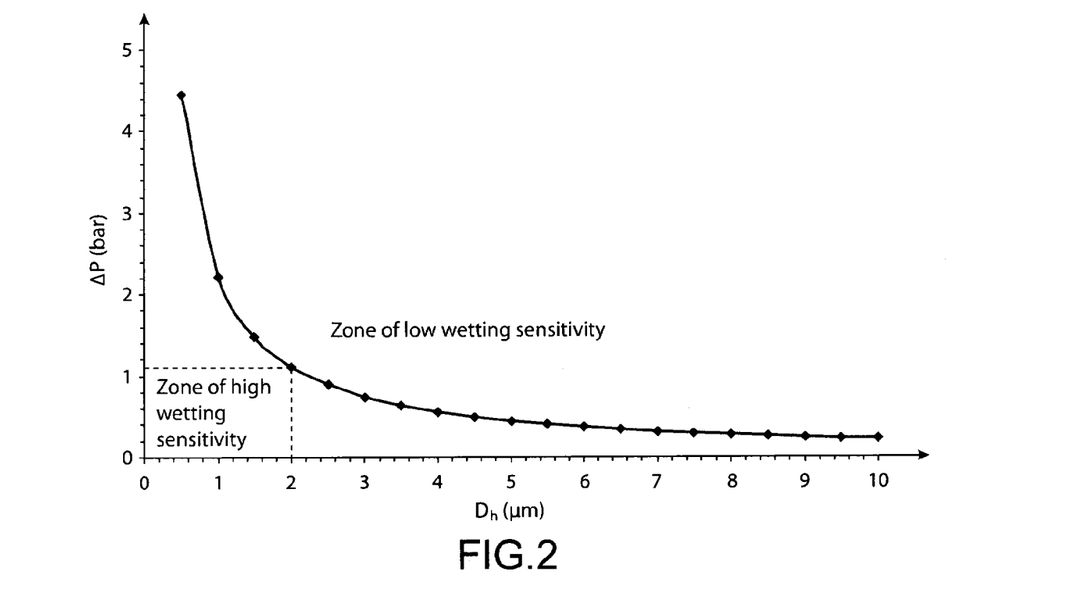
FIG. 2 shows the representative curve of the changes of pressure variations according to the hydraulic diameter of a blind channel of a device according to the invention.

FIG. 2 shows the representative curve of the pressure difference as a function of hydraulic diameter. The zone located above this curve is the zone of low wetting sensitivity, whereas the zone below it is the one of high wetting sensitivity. For example, at a hydraulic diameter of 2 μm the wetting effect is significant if the pressure difference is less than 1.1 bar.

The inventors then studied the influence of the contact angle (wetting angle) on displacement y of the liquid meniscus at the interface with the gas.

Assuming the contact angle to be constant, i.e. writing the relationship $$\cos \theta_e = K \quad (5')$$

The following relationship is found:

$$P - \frac{L_1}{L_1 - y} P_{atm} = \frac{4}{D_h} \sigma K \quad (5)$$

Hence:

$$y = L_1 \left(1 - \frac{P_{atm}}{P - \frac{4}{D_h}\sigma K}\right) \quad (6)$$

Figure 3A:
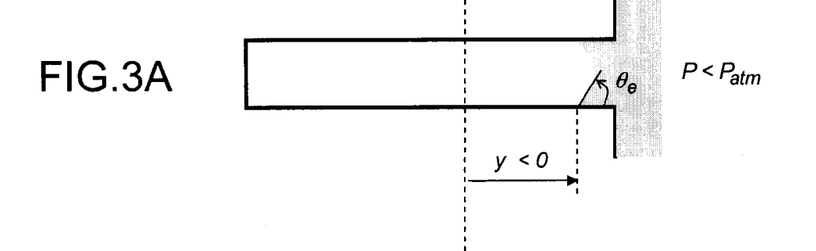
FIGS. 3A to 3C represent, as a lengthways section view of a blind channel of a device according to the invention, three different configurations of contact angle.
Figure 3B:
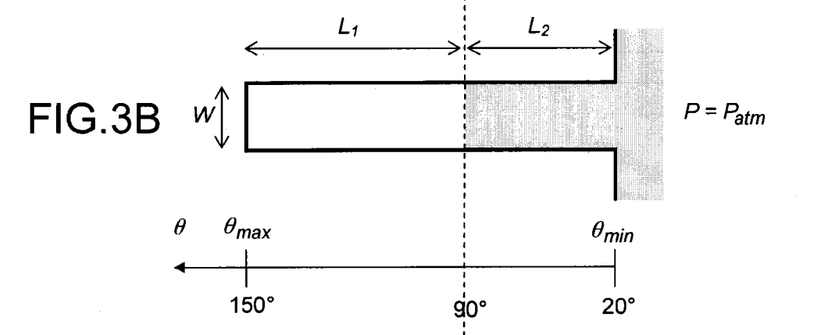
Figure 3C:
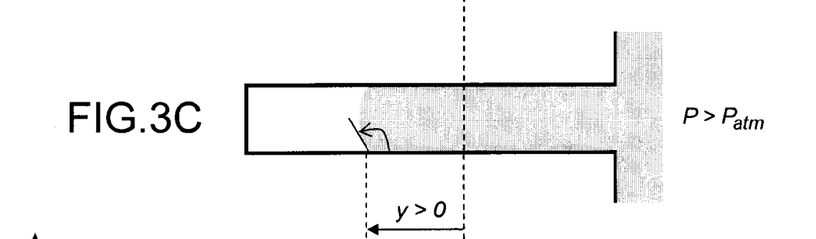

In FIGS. 3A to 3C three configurations of different liquid contact angles of respective values 20°, 90° and 120° have been illustrated, and in which the characteristic dimensions H, L1 and L2 are shown.

Assuming a linear variation of the cosine of the contact angle along the lengthways wall of the blind channel, this gives $$\cos \theta_e = K_1 y \quad (7)$$

where $$K_1 = \frac{\cos \theta_{max}}{L_1} = \frac{-\cos \theta_{min}}{L_2} = \frac{\cos \theta_{max} - \cos \theta_{min}}{L_1 + L_2} \quad (8)$$

Replacing (2) and (3) in (1), this gives the following relationship:

$$P - \frac{L_1}{L_1 - y} P_{atm} = \frac{4}{D_h} \sigma K_1 y \quad (9)$$

$$P(L_1 - y) - L_1 P_{atm} = \frac{4}{D_h} \sigma K_1 (L_1 y - y^2) \quad (10)$$

$$y^2 - \left(L_1 + \frac{P}{\frac{4}{D_h}\sigma K_1}\right) y + \frac{(P - P_{atm})L_1}{\frac{4}{D_h}\sigma K_1} = 0 \quad (11)$$

$$y^2 + G_1 y + G_2 = 0 \quad (12)$$

with $$G_1 = -\left(L_1 + \frac{P}{\frac{4}{D_h}\sigma K_1}\right) \quad (13)$$

$$G_2 = \frac{(P - P_{atm})L_1}{\frac{4}{D_h}\sigma K_1} \quad (14)$$

$K_1 < 0$.
The following relationship is thus found $$y = \frac{-G_1 + \sqrt{G_1^2 - 4G_2}}{2} \quad (15)$$

Assuming a second order variation of the cosine of the contact angle along the lengthways wall of the blind channel, this gives $$\cos \theta_e = K_2 y^2 \quad (16)$$

with $$K_2 = \frac{\cos \theta_{max}}{L_1^2} \quad (17)$$

Thus, for position y of the meniscus, the following relationship is obtained:

$$y^3 - L_1 y^2 - \frac{P}{\frac{4}{D_h}\sigma K_2} y + \frac{(P - P_{atm})L_1}{\frac{4}{D_h}\sigma K_2} = 0 \quad (18)$$

The inventors then undertook a comparative study, choosing the following numerical example:
analysis pressure range of 1 to 2 bar, in order to have great wetting sensitivity,
L1=L2=100 μm,
channel depth and width H=W=1 μm,
angle $\theta_e$ ranging from 0° from the inlet of the blind channel to 90° at length L2,
angle $\theta_e$ ranging from 90° to 150° at length L1 to the end of the blind channel.

Figure 4A:
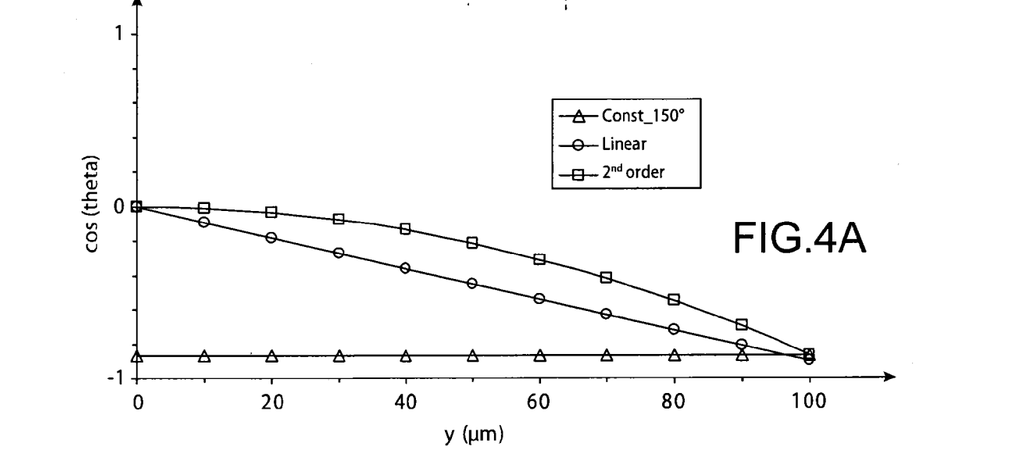
FIG. 4A shows the representative curve of the cosine of angle $\theta_e$ as a function of position y of the liquid meniscus in the blind channel.

FIG. 4A shows the representative curve of the cosine of angle θe as a function of position y of the liquid meniscus.

Figure 4B:
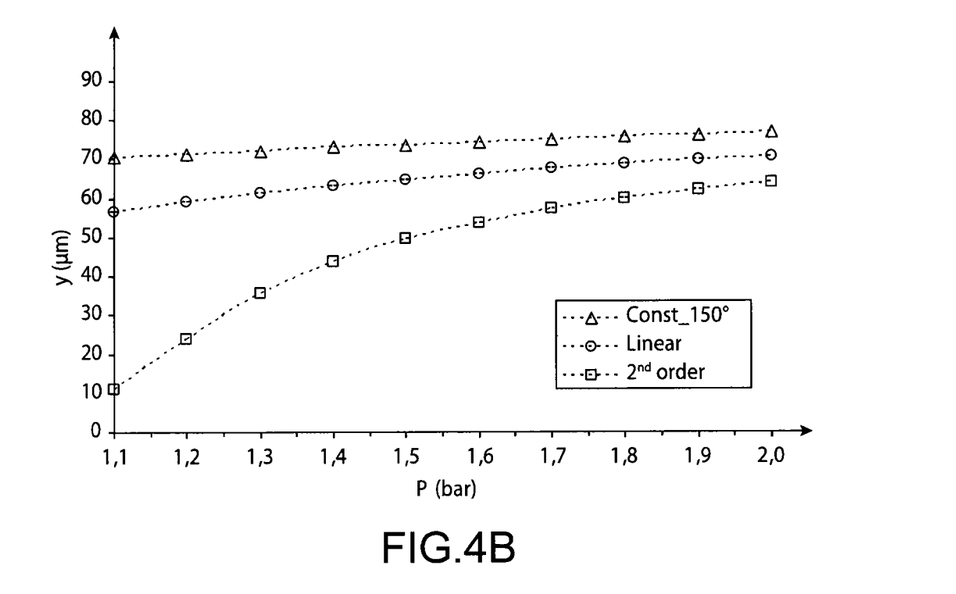
FIG. 4B shows the representative curve of the position of meniscus y as a function of pressure P.

FIG. 4B shows the representative curve of the position of meniscus y as a function of pressure P.

Figure 4C:
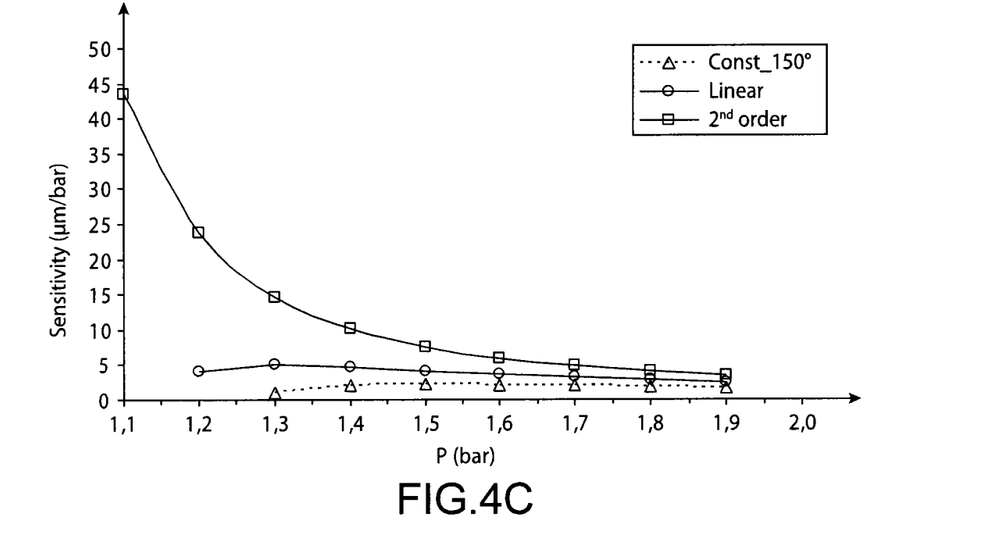
FIG. 4C shows the representative curve of the sensitivity of displacement of the meniscus as a function of pressure P.

FIG. 4C shows the representative curve of the sensitivity of displacement of the meniscus as a function of pressure P.

Thus, on the basis of this analysis, the inventors reached the conclusion that by varying the wetting angle (contact angle), it was possible to increase very substantially the measuring sensitivity of a manometer the measuring principle of which is the position of a liquid meniscus.

In other words, the inventors concluded that through the use of a surface energy gradient the measuring sensitivity of a manometer is able to be increased, compared to a hydrophobic surface with constant surface energy. In addition, they concluded that this increased measuring sensitivity is still more important with a $2^{nd}$ order angle cosine gradient, compared to a linear cosine gradient.

Thus, due to its great measuring sensitivity, a device according to the invention can be of microscopic dimensions for relatively small pressure variations, typically of the order of 1 bar. It may therefore be incorporated in a fluidic network without impairing its compactness or its operation.

To achieve the surface energy gradient on at least one of the lengthways walls, several parameters may be modified, such as the variation of the chemical composition of the material on the surface of the lengthways wall(s) or the variation of the structuring of the lengthways wall(s). The said variation of structuring of a micrometric or nanometric nature involves a variation either of the shape (depth, width) of the cavities, or of the density of the said cavities, or of the shape and of the density of the cavities forming a surface structuring of the said walls. Three solutions may principally be envisaged, as follows:

- a uniform chemical composition and a surface structure with a depth gradient which increases from the inlet of the blind channel to the end,
- a chemical gradient composition from the inlet of the blind channel to the end and a uniform surface structure,
- a chemical gradient composition and a surface structure with a depth gradient from the inlet of the blind channel to the end which is uniform.

For a device of microscopic dimensions to be incorporated in a fuel cell or biphasic fluid heat exchanger, the transverse dimensions (or hydraulic diameter) of the blind channel may be between 50 nm and 5 µm, to measure a pressure variation of greater than 0.5 bar (FIG. 2).

The length of the blind channel may be between 50 nm and 500 µm.

The blind channel may be of roughly rectangular transverse section, i.e. a rectangular or similar shape, with/without ridges (polygonal/ovate).

The means of measuring the position of the liquid meniscus to determine the pressure of the fluid are advantageously partially incorporated in the blind channel.

In an advantageous embodiment, these measuring means include two electrodes positioned on two portions of lengthways walls facing one another, and each extending from the inlet to the end of the blind channel, where the electrodes form with a biphasic fluid present in the blind channel a variable capacitance condenser.

The pressure measurement is determined by the position of the liquid meniscus at equilibrium in the blind channel. The meniscus defines a liquid/vapour volume ratio which varies in the channel according to its position. This volume ratio, or changes in it, can be determined by an electrical measurement of the average capacity of the biphasic fluid in the channel.

The use of two facing electrodes enables the capacitance of the fluid to be measured.

Figure 5:
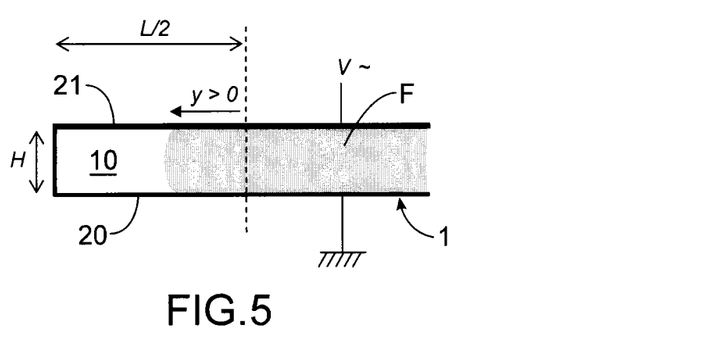
FIG. 5 shows the installation of two electrodes as means for measuring the position of the liquid meniscus in the blind channel of a device according to the invention.

In FIG. 5 an installation of two electrodes 20, 21 has been represented; these are positioned parallel to one another at the top and bottom of blind channel 1.

The distance between the two electrodes is close to the depth of the hydraulic diameter of the manometer.

The lengths and widths of the electrodes are those of the manometer. The total capacitance is the sum of the capacitance of the vapour phase and of the liquid phase of the biphasic fluid $$C_t = C_l + Cv \quad (20)$$

with $$C_l = \varepsilon_0 \varepsilon_l \frac{W(L/2 + y)}{H} \quad (21)$$

$$Cv = \varepsilon_0 \varepsilon v \frac{W(L/2 - y)}{H} \quad (22)$$

relationships in which $\varepsilon_0$ is absolute vacuum permittivity, $\varepsilon_0 = 8.854 \times 10^{-12}$ F/m; $\varepsilon_l$ and $\varepsilon v$ are respectively the relative permittivities in water and in air.

Thus, total capacitance is given by the following relationship:

$$C_t = \frac{W}{H}\varepsilon_0(\varepsilon_l + \varepsilon_a)\frac{L}{2} + \frac{W}{H}\varepsilon_0(\varepsilon_l - \varepsilon_a)y \quad (19)$$

Figure 12A:
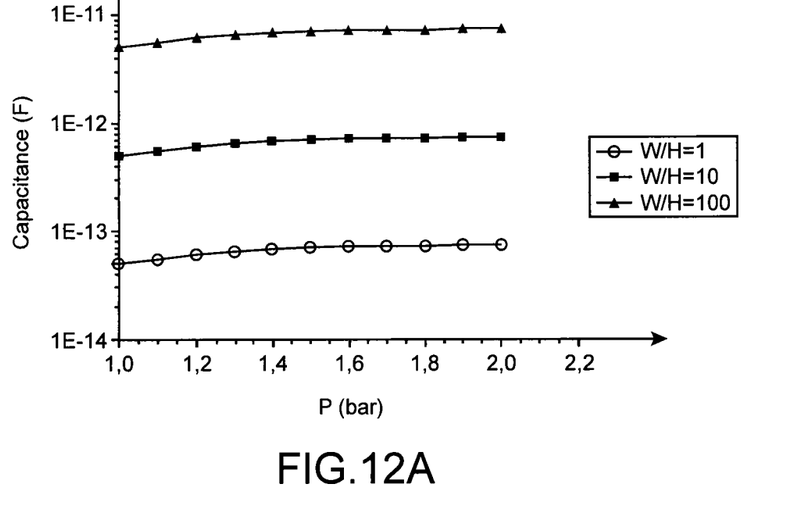
FIGS. 12A to 12D show the different representative curves of the change of capacitance of a biphasic fluid as a function of the pressure and of the position of the liquid meniscus, respectively in a blind channel of the device according to the invention, and according to the value of the ratio between the dimensions of the blind channel.
Figure 12B:
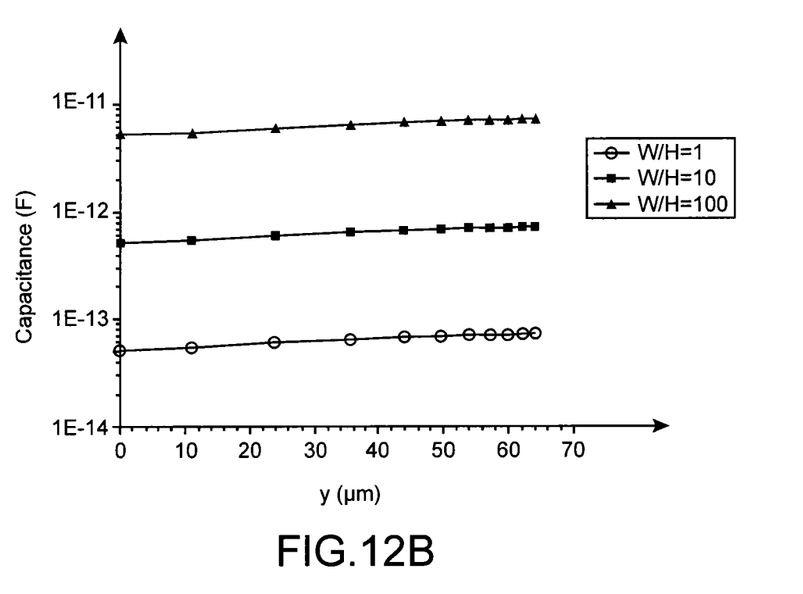
Figure 12C:
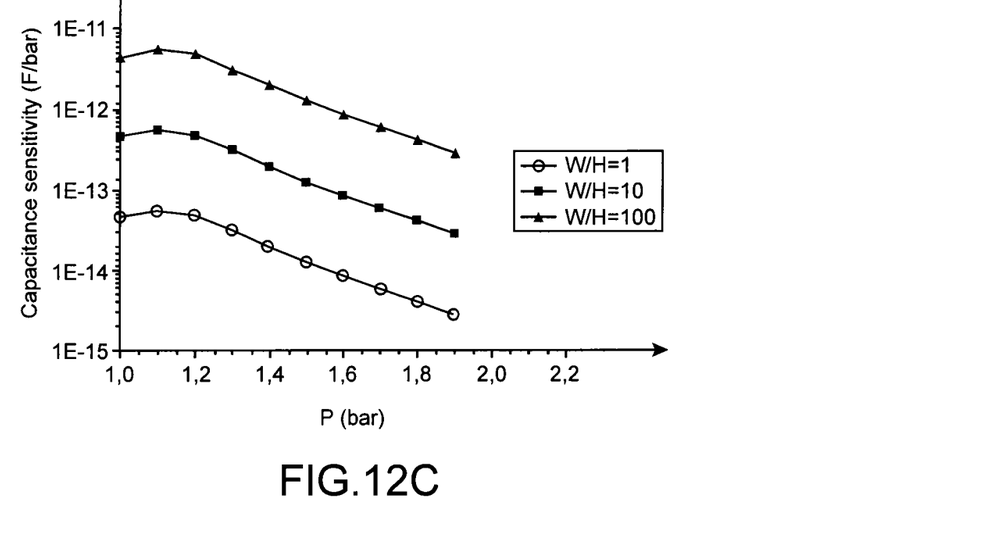
Figure 12D:
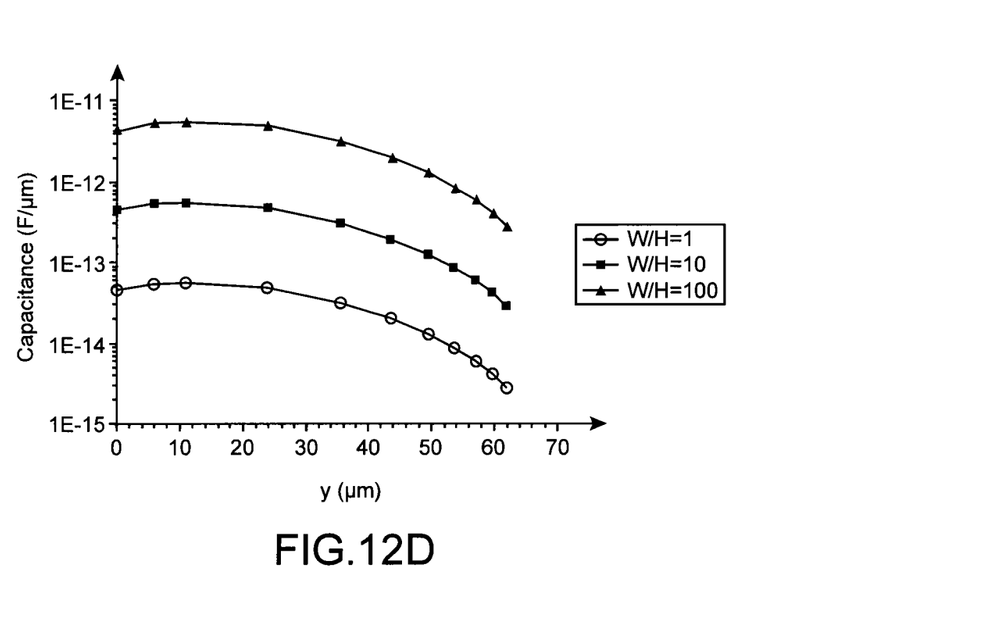

Total capacitance, as a function of the ratio between the transverse dimensions (W/H) of the blind channel, is represented in FIGS. 12A and 12B. FIGS. 12C and 12D show that the higher this ratio the greater will be the measuring sensitivity. In practice this ratio is higher than 1.

The skilled man in the art will naturally take account of the change of relative permittivity of the liquid phase, such as water, as a function of temperature.

The invention also concerns a method of production of a device forming a manometer described above, according to which the following steps are accomplished:

a/ production of a first lengthways portion of a blind channel in a substrate plate including a first portion of a main channel in which a biphasic fluid is able to flow, b/ production of a surface energy gradient in the first portion of the blind channel, c/ production of a second lengthways portion of the blind channel in another substrate plate including a second portion of a main channel within which a biphasic fluid is able to flow, where the first and second lengthways portions of the blind channel are of identical lengths, d/ transfer from one substrate plate to the other, with alignment of both lengthways portions of the blind channel and of both portions of the main channel, e/ fastening of both substrate plates to one another.

To achieve a composition with a chemical gradient according to steps b/ and d/, this can be accomplished by a method known as a SAM (SELF-ALIGNED-MOLECULES) method, and a layer of hydrophobic molecules is firstly deposited on the surface of the channel. The hydrophobic layer is then partially removed by plasma or a laser ablation in order to reveal a hydrophilic substrate locally. The converse is also conceivable: a layer of hydrophilic molecules on a hydrophobic substrate.

Control of the etching/ablation design thus enables a surface chemical gradient to be produced. The gradient can also be obtained by evaporation of a functionalised molecule.

According to a variant embodiment, prior to step d/, the same surface energy gradient is produced on the second lengthways portion of the blind channel.

To incorporate the electrodes as measuring means, before each of steps b/ and d/, a deposit of a thin metal layer is advantageously made, constituting an electrode in each lengthways portion of the blind channel. The electrode can be deposited in a thin layer by a vacuum deposition technique of the PVD type of a metal such as Ti, Cu, etc.

If the plate is conducting, the electrical connection element with the electrodes may be made in the rear face. If this is not the case, a contact path may be made at the same time, using the same method as for the electrode.

Depending on the plate configurations, whether or not they are conducting, it is also possible to plan to have one or more electronically insulating layers (e.g. SiO2, TiO2, etc.) in order to insulate electrically the condenser constituted by the electrodes and the biphasic fluid.

The invention also concerns a fluidic network incorporating one or more previously described devices forming manometers.

The invention also concerns a fuel cell incorporating such a fluidic network, where at least one of the manometers is able to measure the water pressure produced at the cathode or at the anode.

The invention concerns, finally, a biphasic fluid heat exchanger able to pass from a liquid phase to a vapour phase, including such a fluidic network, where at least one of the manometers is able to measure the pressure of the fluid.

BRIEF DESCRIPTION OF THE ILLUSTRATIONS

Other advantages and characteristics of the invention will be shown more clearly on reading the detailed description given as an illustration, and not restrictively, with reference to the following figures which:

FIGS. 7 to 11B show different steps of production of a blind channel of a device according to the invention.

DETAILED ACCOUNT OF PARTICULAR EMBODIMENTS

Comments have been made on FIGS. 1 to 5 in the preamble; no comments will therefore be made here concerning them.

Figure 6:
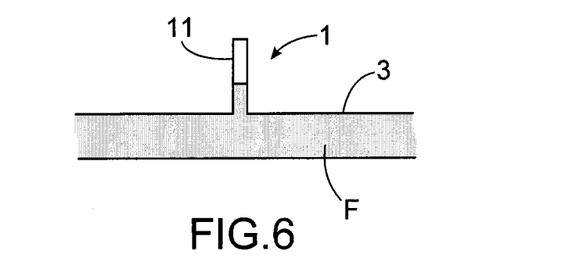
FIG. 6 is a diagrammatic representation of a device according to the invention.

The device forming a manometer according to the invention is intended for measuring the pressure of a biphasic fluid F.

It includes a blind channel 1 emerging in a main channel 3 of a fluidic network, whether open or closed, through which a biphasic fluid F flows. This blind channel 1 thus forms an integral part of the network.

Each of the dimensions (length, depth, width) of blind channel 1 is less than the capillary length of the fluid's liquid phase.

At least one of lengthways walls 11 of blind channel 1 has a surface energy gradient which decreases from its inlet to the end.

Thus, according to the invention, the surface energy gradient enables the wetting angle of the meniscus of the fluid's liquid phase to increase in blind channel 1 from its inlet to the end.

In FIGS. 7 to 11B different steps of production of a device have been represented.

Figure 7:
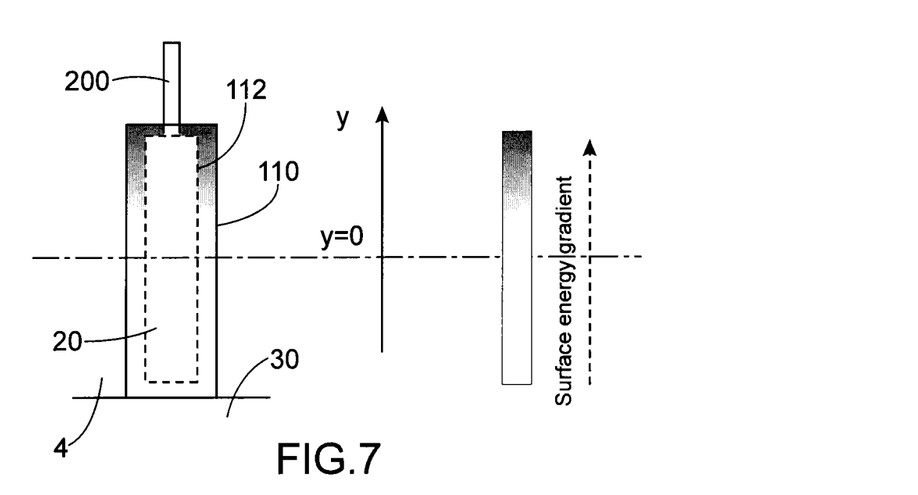

A first lengthways portion 110 of a blind channel is produced in a substrate plate 4 including a first portion 30 of a main channel in which a biphasic fluid is able to flow.

A metal layer is deposited to produce an electrode 20 with its connection 200 on first portion 110. A surface energy gradient 112 is then produced at the surface of electrode 20 (top view of FIG. 7 and section views of FIGS. 8A to 11B).

Similarly, a second lengthways portion 111 of the blind channel is produced in a substrate plate 5 including a second portion of a main channel in which a biphasic fluid is able to flow. A metal layer is also deposited to produce an electrode 21 with its connection; an identical surface energy gradient is then produced on second portion 111 of blind channel 1.

First 111 and second 110 lengthways portions of the blind channel are of identical lengths.

A substrate plate 5 is then transferred on to the other 4 with alignment of both lengthways portions 110, 111 of the blind channel and of both portions of the main channel (FIG. 8A, 9A, 10A, 11A).

Finally, the step of fastening of both substrate plates 4, 5 to one another is then accomplished (FIG. 8B, 9B, 10B, 11B).

Figure 8A:
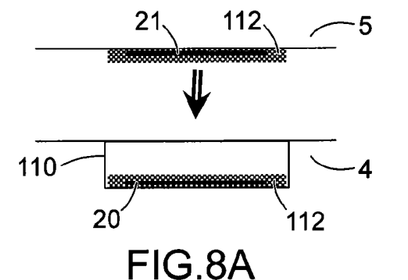
Figure 8B:
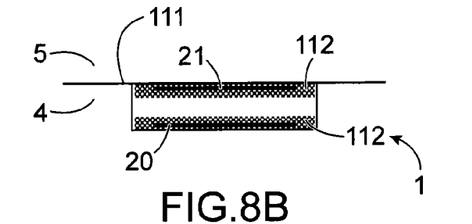

As regards the production of the energy gradient, various approaches are conceivable, such as two identical gradients facing one another (FIGS. 8A and 8B).

Figure 9A:
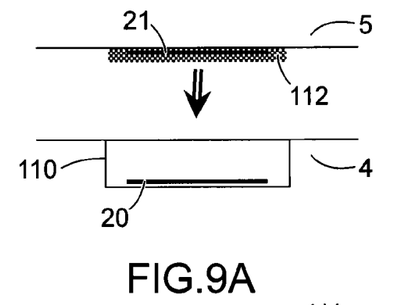
Figure 9B:
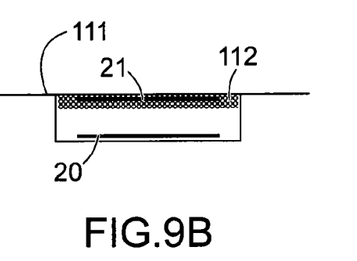
Figure 10A:
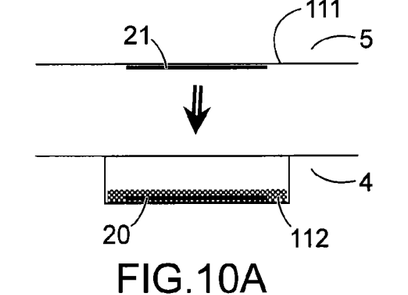
Figure 10B:
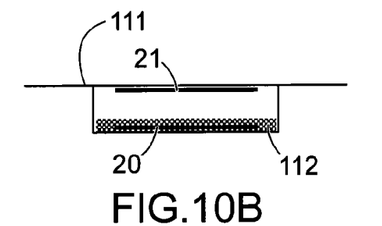

Alternatively, it may be envisaged that one of the walls may not have a gradient, but have a constant surface energy, either hydrophilic, or hydrophobic (FIGS. 9A, 9B, in which first portion 110 of the blind channel has no energy gradient, and FIGS. 10A and 10B, in which second portion 111 which is transferred has no energy gradient).

Figure 11A:
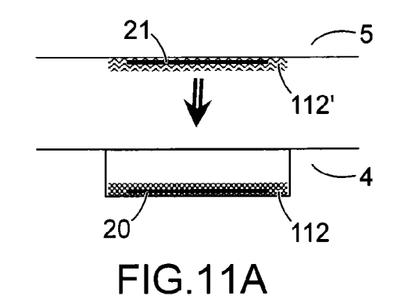
Figure 11B:
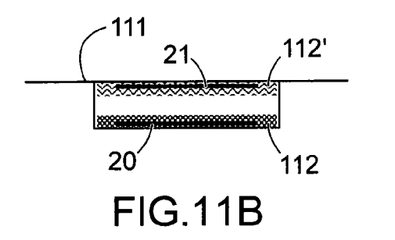

It may also be envisaged that a lengthways wall has a given surface energy gradient, and the other facing lengthways wall has a different surface energy gradient (FIGS. 11A and 11B in which first portion 110 of the channel has a surface energy gradient 112, whereas second portion 111 has a different surface energy gradient 112').

The curves in FIGS. 12A and 12B show the variation of the total capacitance with pressure, and the position of the water meniscus (liquid phase) at the interface with air and water vapour (gaseous phase) respectively in a blind channel according to the ratio between transverse dimensions (W/H).

Although described in relation with a biphasic fluid the liquid phase of which is water and the vapour phase of which is air and water vapour, the invention may apply to many other biphasic fluids.

Similarly, other methods of production may be envisaged to produce the blind channel of the device according to the invention. Mechanical machining of an aluminium or steel substrate, lithography and etching of a silicon substrate, or a replication by injection or embossing of a polymer substrate, may therefore be envisaged.

The invention claimed is:

1. A device forming a manometer, configured to measure pressure of a biphasic fluid in a fluidic network, comprising:
   a first channel inside which a biphasic fluid is able to flow;
   a second channel emerging into the first channel, wherein the second channel is blind, with each of its dimensions less than a capillary length of the fluid's liquid phase, and with at least one of its lengthways walls having a surface energy gradient which decreases from its inlet to an end,
   wherein the surface energy gradient enables a wetting angle of a meniscus of the fluid's liquid phase to be increased in the blind channel from its inlet to the end.

2. A device forming a manometer according to claim 1, further comprising a varied surface structuring in the at least one lengthways wall from the inlet of the blind channel to the end.

3. A device forming a manometer according to claim 1, further comprising a varied surface chemical composition in the at least one lengthways wall from the inlet of the blind channel to the end.

4. A device forming a manometer according to claim 1, further comprising a varied surface structuring and a uniform varied surface chemical composition in the at least one lengthways wall from the inlet of the blind channel to the end.

5. A device forming a manometer according to claim 1, in which transverse dimensions of the blind channel are between 50 nm and 5 µm.

6. A device forming a manometer according to claim 1, in which the ratio between the transverse dimensions (W/H) of the blind channel is greater than 1.

7. A device forming a manometer according to claim 1, in which the length of the blind channel is between 50 nm and 500 µm.

8. A device forming a manometer according to claim 1, in which the blind channel is of a roughly rectangular transverse section.

9. A device forming a manometer according to claim 1, further comprising a measurement instrument which measures the position of the meniscus in the blind channel to determine the pressure of the fluid, wherein the measurement instrument is incorporated partly in the blind channel.

10. A device forming a manometer according to claim 9, in which the measurement instrument includes two electrodes positioned on two portions of lengthways walls facing one another, and each extending from the inlet to the end of the blind channel, wherein the electrodes form with the biphasic fluid in the blind channel a variable capacitance condenser.

11. A method for producing a device forming a manometer, comprising:
   a) producing a first lengthways portion of a blind channel in a substrate plate including a first portion of a main channel in which a biphasic fluid is able to flow;
   b) producing a surface energy gradient in the first portion of the blind channel;
   c) producing a second lengthways portion of the blind channel in another substrate plate including a second portion of a main channel within which a biphasic fluid is able to flow, wherein the first and second lengthways portions of the blind channel are of identical lengths;
   d) transferring from one substrate plate to the other, with alignment of both lengthways portions of the blind channel and of both portions of the main channel;
   e) fastening both substrate plates to one another.

12. A method of production according to claim 11, further comprising, prior to d), producing a same surface energy gradient on the second lengthways portion of the blind channel.

13. A method of production according to claim 12, further comprising, prior to b) and d), making a deposit of a thin metal layer, constituting an electrode in each lengthways portion of the blind channel.

14. A fuel cell, comprising a fluidic network including the device according to claim 1, wherein at least one of the manometers is configured to measure water pressure at the cathode or at the anode.

15. A biphasic fluid heat exchanger configured to pass from a liquid phase to a vapour phase, comprising a fluidic network including the device according to claim 1, wherein at least one of the manometers is configured to measure pressure of the fluid.

* * * * *